United States Patent
Zellhoefer

[11] 3,954,503
[45] May 4, 1976

[54] THERMAL CELL AND METHOD OF MAKING SAME

[75] Inventor: Glenn F. Zellhoefer, Normal, Ill.

[73] Assignee: National Union Electric Corporation, Greenwich, Conn.

[22] Filed: Sept. 23, 1955

[21] Appl. No.: 536,685

[52] U.S. Cl.................................. 136/90; 136/153
[51] Int. Cl.²........................................... H01M 6/36
[58] Field of Search............................. 136/90, 153

[56] References Cited
UNITED STATES PATENTS

| | | | |
|---|---|---|---|
| 2,081,926 | 6/1937 | Gyuris | 136/83 |
| 2,102,701 | 12/1937 | Gyuris | 136/83 |

*Primary Examiner*—Verlin R. Pendegrass
*Attorney, Agent, or Firm*—Hibben, Noyes & Bicknell, Ltd.

EXEMPLARY CLAIM

1. A fusible salt electrolyte cell system including a compressed mass of non-fused electrolyte admixed with an adsorbent binder and in intimate contact with an anode, said adsorbent binder being present throughout the mass in an amount sufficient to impart non-flow characteristics to the fused electrolyte so as to maintain the electrolyte against substantial displacement under pressure when the electrolyte is fused thereby to retain the fused electrolyte in intimate contact with said anode, said binder essentially comprising dehydrated kaolinite in a sheet layer crystalline structure form.

14 Claims, 4 Drawing Figures

INVENTOR.
GLENN F. ZELLHOEFER
BY
E. J. Balluff

THERMAL CELL AND METHOD OF MAKING SAME

This invention relates to thermal cell systems and methods of making the same and has particular reference to certain new and useful improvements for preventing and/or retarding the flow of the electrolyte when the same is activated.

Thermal cells to which the invention relates are electrochemical power supplies based upon electrolytes of various inorganic salts which remain solid and non-conducting at all storage temperatures. When the cell is heated to an elevated temperature, the electrolyte fuses and becomes conducting and electrical energy may then be withdrawn from the system. The invention contemplates the admixture of an adsorbent with the electrolyte which prevents or retards the flow of the electrolyte when the cell is activated without interfering with the wetting of the electrodes by the electrolyte or impairing the efficiency of the system.

The invention also comtemplates other features which will presently appear.

Heretofore it has been the practice to impregnate a glass fiber tape with the electrolyte in order to retain the electrolyte in operative position with respect to the electrodes. This has limited the materials which might be used in cells of this kind and in some instances causes undesirable side reactions which impair the utility or efficiency of the cell. Efforts to seal the electrolyte within the cell have not generally been successful and in addition are difficult and expensive to accomplish. The present invention overcomes the disadvantages heretofore experienced and also makes it possible to construct cells in which forces generated by spinning of the cell or by changes in velocity of the cell do not effect the proper disposition of the electrolyte with respect to the electrodes.

A principal object of the invention is, therefore, to provide a new and improved thermal cell system and method of making the same.

Another object of the invention is to provide a new and improved means for preventing or retarding flow of the electrolyte when the cell is activated.

Other objects and advantages of the invention will be apparent from the following specification.

In the single sheet of drawings;

FIG. 2 is a perspective view of the shell for a multicell structure;

FIG. 3 is an exploded view illustrating the disposition of the cell assembly in series; and FIG. 4 is a perspective view of the closure for the shell.

Thermal cells embodying the invention employ fused salt electrolytes such as LiCl-KCl; $CdCl_2$-NaCl-KCl; and $CaCl_2$-NaCl-KCl, admixed with a deplorarizing agent; and may use a variety of anodes such as magnesium or calcium. LiCl-KCl is preferred as an electrolyte because of the excellence of the results obtained by using it in practicing the invention as herein disclosed, and magnesium is preferred as an anode.

According to one form of the invention the electrolyte of the thermal cell essentially comprises a compressed mass of KCl-LiCl admixed with a depolarizing agent and an adsorbent binder material; the depolarizing agent essentially comprising $V_2O_5$; and the adsorbent binder essentially comprising dehydrated kaolinite in a sheet layer crystalline form admixed with the electrolyte and present in an amount sufficient to retard and/or prevent the flow of the electrolyte when the same fuses without interfering with the wetting of the electrodes by the electrolyte. Such cell further includes a cathode essentially comprising a coating formed by solidifying a fusion of $B_2O_3$ and $V_2O_5$ on a cathode metal, said $B_2O_3$ comprising at least about 5% by weight of the combined weight of said coating of $B_2O_3$ and $V_2O_5$; and an anode essentially comprising pressed, powdered metal selected from the group consisting of magnesium and calcium. The cathode metal may be one selected from the group consisting of Ni, Ag, Cu and stainless steel. Best results have been obtained where the percentage of $B_2O_3$ in the fused coating on the cathode contains from about 16 to about 28% by weight of the combined weight of the $B_2O_3$ and $V_2O_5$ components of such coating, and where the cathode consists of a thin perforated strip of stainless steel having a very thin coating on the surface thereof exposed to and in contact with the electrolyte. Coatings of the order of 0.002 inch to 0.006 inch have been found to be very useful.

Figure 3:
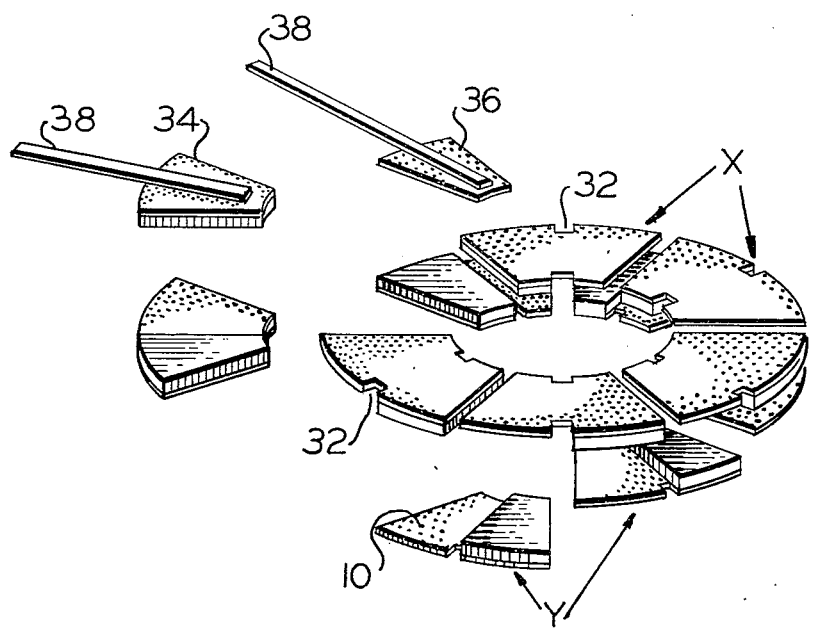
Figure 1:
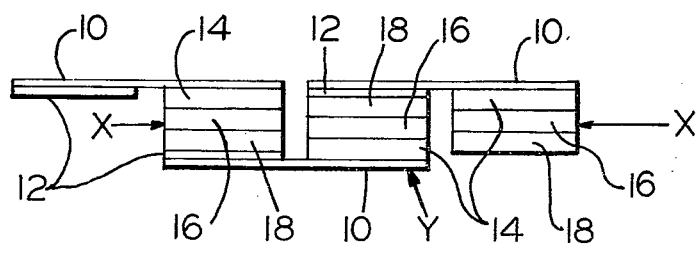
FIG. 1 is a schematic view illustrating an assembly of a series of cells embodying my invention.

FIG. 1 illustrates a series of cells of types X and Y of the type illustrated in FIG. 3. Each cell consists of a cathode comprising a very thin strip 10 of perforated stainless steel having a cathode coating 12 of the character previously described fused on one end of one face thereof. The electrolyte preferably consists of a cathode layer 14 and an anode layer 16 and the anode consists of a layer 18 of pressed, powdered metal of the character previously described. The cathode layer 14 preferably consists of equal parts of KCl and LiCl admixed with an adsorbent of the character previously described and a depolarizer agent of the character previously described. For example, the cathode layer may consist of 13.5% KCl, 13.5% LiCl, 44.5% kaolin and 28.5% of a depolarizing agent. The anode layer preferably consists of equal parts of KCl and LiCl and an adsorbing agent of the character previously described admixed therewith. Preferably the anode layer is substantially free of a depolarizing agent. The percentage of the adsorbent agent used in either case depends upon the design of the cell and the amount required to retard or prevent the flow of electrolyte when the cell is activated and subjected to the conditions of use. For some applications it is desirable to omit kaolin in the cathode layer. Thus, the amount of adsorbing agent may vary widely and in any event it should not be used in such amount as to prevent the electrolyte from wetting the electrodes when the electrolyte is fused.

The adsorbing material may be prepared by employing a commercial grade of kaolin ($Al_2O_3 \cdot 2H_2O \cdot 2SiO_2$ — a native aluminum silicate) which is spread in a shallow tray to uniform depth of 1 cm and then heated to 585°–600°C for 4 hours to remove moisture and water of hydration. This method of dehydration affords a product with the desired physical properties, — that is an adsorbent material in a sheet layer crystalline structure form. Since temperature and the time of heating influence the adsorbing properties, it is necessary to carry out the dehydration process under controlled conditions to insure the desired performance of the adsorbing agent.

For the anode layer, dry KCl-LiCl and dehydrated kaolin prepared as indicated above are mixed in weight proportions of 26.66–26.66 and 46.66 and ball milled. Dry KCl-LiCl-$V_2O_5$ and dehydrated kaolin are mixed in weight proportions as heretofore stated for the cathode layer, and ball milled.

According to one method the cavity of the die is charged with a layer of KCl-LiCl-$V_2O_5$-kaolin loose powder 65 mils deep, then with a layer of KCl-Li-Cl-kaolin loose powder 60 mils deep, and then with a layer of loose powdered magnesium or calcium 20 mils deep. The uncoated half of the perforated stainless steel electrode is placed over and in contact with the column of powders. A block is then placed over the stainless steel and then the punch at the bottom of the die is raised to press the powders under a pressure of 50,000–60,000 psi. Thereby a three-layer pellet is formed that is approximately 44 mils thick with the anode intimately united with the anode layer of the electrolyte and with the cathode layer of the electrolyte intimately united with the anode layer. In order to insure good conductance it is important that the powders be compressed as described so as to avoid stratification of any of the layers.

The optimum ratio for the constitutuents in the electrolyte pellet depends on the operating conditions of the battery. The principal considerations are static pressure and the spin forces imposed on the electrolyte during the activation period, and as previously indicated the adsorbing material concentration must be sufficiently high to impart the required non-flow characteristics to the electrolyte under the given operating conditions of the battery, but the adsorbent material must not exceed the maximum allowable to permit the adequate wetting of the electrodes by the electrolyte. I have found that the optimum ratios of the anode layer and the cathode layer is 1:1.05–1:1.15 although these ratios may be departed from with some impairment of the electro-chemical efficiency of the cell. The use of two layers of electrolyte is for the purpose of improving the electrochemical properties of the electrolyte and does not effect the non-flow properties. A two layer electrolyte permits the use of a higher concentration of depolarizing agent in the cathode layer than in the case when a single layer electrolyte is employed. For some applications a single layer electrolyte may be employed, admixed with the adsorbing material and the depolarizing agent previously referred to, but I have not found it to be as desirable as the two-layer electrolyte.

The perforated stainless steel strip is readily adapted to receive the fused cathode coating of $B_2O_3$ and $V_2O_3$ as previously discussed and in addition the perforated stainless steel strip is also adapted to be pressed into intimate contact with the cathode layer 14 of the electrolyte. The stainless steel strip 10 serves to serially connect adjacent cells as shown in FIG. 1.

Figure 4:
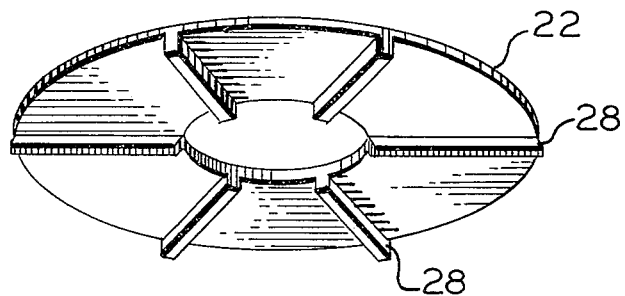
FIGS. 2, 3 and 4 are exploded views showing a multicell structure embodying the invention.
Figure 2:
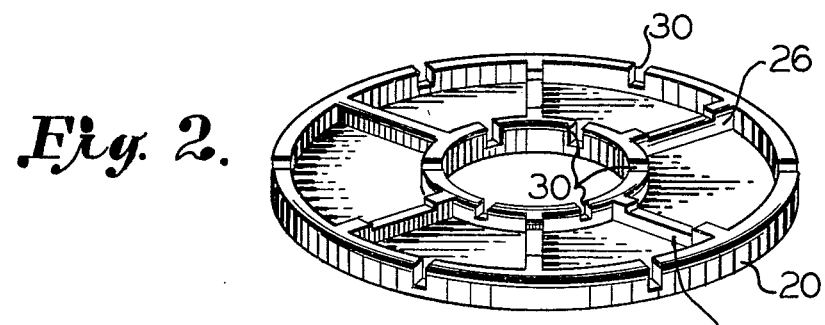

The multicell as shown in FIGS. 2, 3 and 4 consists of an annular shell 20 and a closure 22 providing a casing or housing for the cells. Heat generating material disposed in heat transfer relation with the cells may be employed for supplying heat to the cells for activating the same. The shell 20, which may be formed out of any suitable dielectric material, is provided with a series of integral ribs 26 to divide the space inside the shell into a series of compartments, and the closure 22 is provided with a series of ribs 28 which, when the closure 22 is assembled with the shell 20, is adapted to divide each of such compartments into two parts, each part of each compartment being adapted to accomodate a cell. The X types of cells previously described are annularly arranged on top of and out-of-phase with an annular row of Y type of cells and in series relation as shown in FIG. 1. Each of the Y cells is located by and between a pair of adjacent ribs 26 and separated thereby from each other, while the X cells are located by a pair of adjacent ribs 28 and also separated thereby. The shell 20 is provided with a series of slots 30 disposed midway between ribs 26 for accommodating the ribs 28. The ribs 26 are notched out as indicated so as to accommodate and locate the X type of cells, the stainless steel strips of which being notched out as indicated at 32. Each X cell thus constitutes a bridge between adjacent Y cells and each Y cell constitutes a bridge between adjacent X cells. Terminal cells 34 and 36 each provided with a lead 38 are provided at one place in the ring so that the series of cells may be connected into an electric circuit.

Single cells were made with a cathode consisting of a 22% $B_2O_3$-78% $V_2O_5$ coat fused on a stainless steel perforated plate, a magnesium anode and a two-layer electrolyte pellet as described above. These cells were tested with activation temperatures of 490°–510°C, cooling during discharge to 430°–460°C, and a static pressure of 30–100 psi imposed on the cells. The peak voltage attained was 2.5–2.6 volts and the life to 80% peak voltage was 185–200 seconds under a current drain of 100 ma/cm$^2$.

In the type of cells described calcium was substituted for magnesium and tested under the conditions indicated. These cells have a peak voltage of 3.3–3.5 volts and a life to 80% peak voltage of 35–45 seconds under a load of 100 mg/cm$^2$ and a life of 175–250 seconds under a load of 20 ma/cm$^2$.

Reference herein to powder or powdered material shall be construed to include granular material.

The ring assembly of cells illustrated forms a part of a battery, it being understood that a stack of such rings with heat generating material sandwiched therebetween is assembled to form a battery with the cells connected serially. For example batteries have been thus constructed with voltages of 120–500 volts and providing a current drain of 5–50 ma/cm$^2$. A 3 amp 30 volt battery of a design different than that illustrated and providing for a current drain of 180 ma/cm$^2$ has also been constructed.

The adsorbent material must be of such a character that it is essentially inert to the electrolyte and the depolarizer under the activated conditions of the cell and in addition the adsorbent must retain its sheet layer crystalline structure form under such activated conditions.

While I have described several embodiments of the invention it is capable of modification, therefore I do not wish to be limited to the precise details set forth, but desire to avail myself of such changes as fall within the scope of the following claims.

I claim:

1. A fusible salt electrolyte cell system including a compressed mass of non-fused electrolyte admixed with an adsorbent binder and in intimate contact with an anode, said adsorbent binder being present throughout the mass in an amount sufficient to impart non-flow characteristics to the fused electrolyte so as to maintain the electrolyte against substantial displacement under pressure when the electrolyte is fused thereby to retain the fused electrolyte in intimate contact with said anode, said binder essentially comprising dehydrated kaolinite in a sheet layer crystalline structure form.

2. A cell according to claim 1 wherein said adsorbent is kaolin.

3. A cell according to claim 1 wherein said anode essentially comprises pressed, powdered metal selected from the group consisting of magnesium and calcium.

4. A cell according to claim 3 wherein said electrolyte and anode consists of a compressed mass with the anode in intimate contact with the electrolyte.

5. That method of imparting non-flow characteristics to the electrolyte of a fusible salt electrolyte cell of the character described which consists of admixing non-fused electrolyte with an adsorbent binder and compressing said mixture, and wherein said adsorbent is added to such mixture in an amount sufficient to impart non-flow characteristics to the fused electrolyte thereby to maintain the fused electrolyte against substantial displacement under pressure, said binder essentially comprising dehydrated kaolinite in a sheet layer crystalline structure form.

6. That method according to claim 5 wherein said adsorbent is kaolin.

7. A fusible salt electrolyte cell system wherein the non-fused electrolyte essentially comprises a mixture of KCl-LiCl admixed with a binder essentially consisting of dehydrated kaolinite in a sheet layer crystalline structure form, said mixture being in intimate contact with an electrode of the cell and said kaolinite being present in an amount sufficient to impart non-flow characteristics to the fused electrolyte, thereby to maintain the fused electrolyte against substantial displacement under pressure and in imtimate contact with said electrode.

8. A cell according to claim 7 wherein said adsorbent material is kaolin.

9. A fusible salt electrolyte cell system wherein the non-fused electrolyte essentially comprises a compressed mass of KCl-LiCl admixed with a depolarizing agent and an adsorbent binder, said depolarizing agent essentially comprising $V_2O_5$, said adsorbent binder essentially comprising dehydrated kaolinite in a sheet layer crystalline structure form, a cathode in intimate contact with such electrolyte and essentially comprising a coating formed by a solidified fusion of $B_2O_3$ and $V_2O_5$ on a cathode metal, said $B_2O_3$ comprising at least about 5% by weight of the combined weight of said coating of $B_2O_3$ and $V_2O_5$, and an anode in intimate contact with such electrolyte and comprising pressed, powdered metal selected from the group consisting of magnesium and calcium, said cathode metal being selected from the group consisting of Ni, Ag, Cu and stainless steel, said adsorbent binder being present in such mass in an amount sufficient to impart non-flow characteristics to the the fused electrolyte so as to maintain the electrolyte against substantial displacement under pressure when the electrolyte is fused thereby to maintain such fused electrolyte in contact with the electrodes of the cell.

10. A cell system according to claim 9 wherein said adsorbent binder is kaolin.

11. A cell system according to claim 9 wherein said electrolyte consists of an anode layer of KCl and LiCl admixed with said adsorbent binder and substantially free of a depolarizing agent, and a cathode layer of KCl-LiCl admixed with said depolarizing agent.

12. A cell according to claim 9 wherein said cathode metal is a perforated stainless steel strip.

13. A fusible salt electrolyte cell wherein the non-fused electrolyte comprises a compressed mass consisting essentially of an anode layer of KCl and LiCl in intimate contact with the anode of the cell, and a cathode layer of KCl and LiCl admixed with a depolarizing agent, and wherein said anode layer is admixed with an adsorbent binder essentially comprising dehydrated kaolinite in a sheet layer crystalline structure form, said adsorbent binder being present in said non-fused anode layer in an amount sufficient to impart non-flow characteristics to the fused anode layer so as to maintain said anode layer against substantial displacement under pressure when the electrolyte thereof is fused thereby to retain such fused electrolyte in contact with the anode of the cell and said anode layer being substantially free of a depolarizing agent.

14. A fusible salt electrolyte cell wherein the non-fused electrolyte comprises a compressed mass consisting of an anode layer, in intimate contact with the anode of the cell and a cathode layer admixed with a depolarizing agent, said anode layer being admixed with an adsorbent binder essentially comprising dehydrated kaolinite in a sheet layer crystalline structure form and said binder being present in said anode layer in an amount sufficient to impart non-flow characteristics to the electrolyte thereof so as to maintain the fused electrolyte of the anode layer against substantial displacement under pressure thereby to retain such fused electrolyte in contact with the anode of the cell.

* * * * *